US009930527B2

United States Patent
Schell et al.

(10) Patent No.: US 9,930,527 B2
(45) Date of Patent: *Mar. 27, 2018

(54) METHODS AND APPARATUS FOR STORAGE AND EXECUTION OF ACCESS CONTROL CLIENTS

(71) Applicant: Apple Inc., Cupertino, CA (US)

(72) Inventors: Stephan V. Schell, San Mateo, CA (US); Jerrold Von Hauck, Windermere, FL (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,308

(22) Filed: Dec. 8, 2016

(65) Prior Publication Data

US 2017/0188234 A1  Jun. 29, 2017

Related U.S. Application Data

(60) Continuation of application No. 14/543,773, filed on Nov. 17, 2014, now Pat. No. 9,532,219, which is a
(Continued)

(51) Int. Cl.
*H04W 12/06* (2009.01)
*H04L 29/06* (2006.01)
(Continued)

(52) U.S. Cl.
CPC ......... *H04W 12/06* (2013.01); *H04L 63/0823* (2013.01); *H04W 4/001* (2013.01);
(Continued)

(58) Field of Classification Search
CPC ........................... H04W 12/06; H04L 63/0823
(Continued)

(56) References Cited

U.S. PATENT DOCUMENTS 5,839,119 A   11/1998  Krsul et al.
6,009,173 A   12/1999  Sumner
(Continued)

FOREIGN PATENT DOCUMENTS

CN    101222711 A    7/2008
EP    2076071 A1     7/2009
(Continued)

OTHER PUBLICATIONS

3rd Generation Partnership Project; Technical Specification Group Services and System Aspects; Feasibility Study on Remote Management of USIM Application on M2M Equipment; (Release 8); 3GPP TR 33.812 V0.3.0 (May 2008), pp. 1-61.
(Continued)

*Primary Examiner* — Matthew Henning
(74) *Attorney, Agent, or Firm* — Downey Brand LLP (57) ABSTRACT

Disclosed herein is a technique for securely provisioning access control entities (e.g., electronic Subscriber Identity Module (eSIM) components) to a user equipment (UE) device. In one embodiment, a UE device is assigned a unique key and an endorsement certificate that can be used to provide updates or new eSIMs to the UE device. The UE device can trust eSIM material delivered by an unknown third-party eSIM vendor, based on a secure certificate transmission with the unique key. In another aspect, an operating system (OS) is partitioned into various sandboxes. During operation, the UE device can activate and execute the OS in the sandbox corresponding to a current wireless network. Personalization packages received while connected to the network only apply to that sandbox. Similarly, when loading an eSIM, the OS need only load the list of software necessary for the current run-time environment. Unused software can be subsequently activated.

20 Claims, 8 Drawing Sheets

Related U.S. Application Data division of application No. 13/080,521, filed on Apr. 5, 2011, now Pat. No. 8,924,715.

(60) Provisional application No. 61/407,866, filed on Oct. 28, 2010.

(51) Int. Cl.
*H04W 4/00* (2018.01)
*H04W 8/18* (2009.01)
*H04W 8/20* (2009.01)
*H04W 8/26* (2009.01)

(52) U.S. Cl.
CPC ............ *H04W 4/003* (2013.01); *H04W 8/18* (2013.01); *H04W 8/205* (2013.01); *H04W 8/265* (2013.01)

(58) Field of Classification Search
USPC ........................................................ 726/7, 3
See application file for complete search history.

(56) References Cited

U.S. PATENT DOCUMENTS

| | | | |
|---|---|---|---|
| 6,694,134 | B1 | 2/2004 | Lu et al. |
| 6,873,609 | B1 | 3/2005 | Jones et al. |
| 7,340,276 | B2 | 3/2008 | Irisawa |
| 7,912,010 | B2 | 3/2011 | Ito et al. |
| 8,712,474 | B2 | 4/2014 | Gehrmann |
| 9,532,219 | B2 * | 12/2016 | Schell |
| 2002/0091931 | A1 | 7/2002 | Quick, Jr. et al. |
| 2002/0166048 | A1 | 11/2002 | Coulier |
| 2002/0180589 | A1 | 12/2002 | Gabara |
| 2003/0139180 | A1 | 7/2003 | McIntosh et al. |
| 2004/0204089 | A1 | 10/2004 | Castrogiovanni et al. |
| 2005/0108171 | A1 | 5/2005 | Bajikar et al. |
| 2005/0177733 | A1 | 8/2005 | Stadelmann et al. |
| 2005/0239498 | A1 | 10/2005 | Dorenbosch et al. |
| 2005/0246253 | A1 | 11/2005 | Barthelemy |
| 2006/0172772 | A1 | 8/2006 | Bjorkner |
| 2006/0183500 | A1 | 8/2006 | Choi |
| 2007/0203943 | A1 | 8/2007 | Adlung et al. |
| 2008/0014928 | A1 | 1/2008 | Chen |
| 2008/0016504 | A1 | 1/2008 | Cheng et al. |
| 2008/0026149 | A1 | 1/2008 | Tomasini et al. |
| 2008/0089276 | A1 | 4/2008 | Ito et al. |
| 2008/0182615 | A1 | 7/2008 | Xue et al. |
| 2008/0261561 | A1 | 10/2008 | Gehrmann |
| 2009/0070861 | A1 | 3/2009 | Jain |
| 2009/0077643 | A1 | 3/2009 | Schmidt et al. |
| 2009/0163175 | A1 | 6/2009 | Shi et al. |
| 2009/0191857 | A1 | 7/2009 | Horn et al. |
| 2009/0205028 | A1 | 8/2009 | Smeets et al. |
| 2009/0259771 | A1 | 10/2009 | Tanik et al. |
| 2009/0271850 | A1 | 10/2009 | Hoppe et al. |
| 2010/0050241 | A1 | 2/2010 | Yan et al. |
| 2010/0062808 | A1 | 3/2010 | Cha et al. |
| 2010/0070761 | A1 | 3/2010 | Gustave et al. |
| 2010/0210304 | A1 | 8/2010 | Huslak |
| 2010/0242100 | A1 | 9/2010 | Korhonen |
| 2010/0262829 | A1 | 10/2010 | Brown et al. |
| 2010/0311391 | A1 | 12/2010 | Siu et al. |
| 2010/0311468 | A1 | 12/2010 | Shi et al. |
| 2011/0099605 | A1 | 4/2011 | Cha et al. |
| 2011/0151836 | A1 | 6/2011 | Dadu et al. |

FOREIGN PATENT DOCUMENTS

| | | |
|---|---|---|
| JP | 2002271261 A | 9/2002 |
| JP | 2005524184 A | 8/2005 |
| JP | 2006154997 A | 6/2006 |
| JP | 2007329963 A | 12/2007 |
| JP | 2010532107 A | 9/2010 |
| TW | 200806057 A | 1/2008 |
| TW | 200829040 A | 7/2008 |
| WO | 02063900 A1 | 8/2002 |
| WO | 2009126083 A1 | 10/2009 |
| WO | 2010102236 A2 | 9/2010 |
| WO | 2010123890 A1 | 10/2010 |

OTHER PUBLICATIONS

Chinese Application for Invention No. 201110462171.2—First Office Action dated Jan. 14, 2014.
European Patent Application No. 11187068.9—Office Action dated Mar. 21, 2014.
Taiwanese Patent Application No. 100138902—Office Action dated Jun. 16, 2014.
3GPP TR 33.812 v9.1.0 (Apr. 2010)—3rd Generation Partnership Project; Technical Specification Group Services and System Aspects; Feasibility study on the security aspects of remote provisioning and change of subscription for Machine to Machine (M2M) equipment (Release 9), pp. 1-87.
European Patent Application No. 11187068.9—Extended European Search Report dated Feb. 21, 2012.
Russian Patent Application No. 2011144919—Office Action dated Apr. 25, 2013.
Kasper, M. et al. "Subscriber Authentication in mobile cellular Networks with virtual software SIM Credentials using Trusted Computing", Advanced Communication Technology, 10th International Conference, published on Mar. 2008, found at: http://www.researchgate.netpublication/432529I_Subscriber_Authentication_in_CellularNetworkswithTrustedVirtual_SIMs, pp. 1-7.
Korean Patent Application No. 10-2014-106320—Office Action dated Apr. 10, 2015.
Chinese Application for Invention No. 201110462717.2—Fourth Office Action dated Nov. 3, 3015.
Taiwanese Patent Application No. 104137760—Office Action dated Oct. 28, 2016.
Japanese Patent Application No. 2016-080446—Office Action dated Jan. 10, 2017.
Korean Patent Application No. 10-2015-0048541—Office Action dated Jan. 18, 2017.
Li Gong et al, Inside JavaTM 2 Platform Security: Architecture, API Design, and Implementation, Second Edition, Addison-Wesley Professional, 2003.
European Patent Application No. 17172973.4—Extended European Search Report dated Nov. 11, 2017.
"TCG MPWG Mobile Reference Architecture.Specification version 1.0 Revision I", TCG, 1' Jun. 2, 2007 (Jun. 12, 2007), pp. 1-87, XP002516393, Retrieved from the Internet: URL: https://www.trustedcomputinggroup.org/specs/mobilephonen/tcgmobilereference-architecture-1.0.pdf [retrieved on Feb. 23, 2009] *p. 17, paragraph 3—p. 37, paragraph 4 *, * p. 61, paragraph 6.3.3—p. 69, paragraph 6.3.4 *, 88 pages.
Eimear Gallery et al: "Trusted Mobile Platforms", Aug. 18, 2007 (Aug. 18, 2007), Foundations of Security Analysis and Design IV; [Lecture Notes in Computer Science], Springer Berlin Heidelberg, Berlin, Heidelberg, pp. 282-323, XP019099702, ISBN: 978-3-540 74809-0 * paragraph [0004]—paragraph [0005] *, * paragraph [0010] *, 44 pages.
Korean Patent Application No. 10-2015-0048541—Notice of Preliminary Rejection, dated Oct. 25, 2017.

* cited by examiner

METHODS AND APPARATUS FOR STORAGE AND EXECUTION OF ACCESS CONTROL CLIENTS

CROSS-REFERENCE TO RELATED APPLICATIONS

This application is a continuation of U.S. application Ser. No. 14/543,773, filed Nov. 17, 2014, entitled "METHODS AND APPARATUS FOR STORAGE AND EXECUTION OF ACCESS CONTROL CLIENTS," now U.S. Pat. No. 9,532,219 issued Dec. 27, 2016, which is a divisional of U.S. application Ser. No. 13/080,521, filed Apr. 5, 2011, entitled "METHODS AND APPARATUS FOR STORAGE AND EXECUTION OF ACCESS CONTROL CLIENTS," now U.S. Pat. No. 8,924,715, issued on Dec. 30, 2014, which claims the benefit of U.S. Provisional Application No. 61/407,866, filed Oct. 28, 2010, of the same title, the contents of which are incorporated herein by reference in their entirety for all purposes.

FIELD

The present invention relates generally to the field of wireless communication and data networks. More particularly, in one exemplary aspect, the present invention is directed to methods and apparatus for secure modification, storage and execution of access control entities or clients.

BACKGROUND

Access control is required for secure communication in most prior art wireless radio communication systems. As an example, one simple access control scheme might comprise: (i) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) executing on a physical Universal Integrated Circuit Card (UICC). The USIM access control client authenticates the subscriber to the UMTS cellular network. After successful authentication, the subscriber is allowed access to the cellular network. As used hereinafter, the term "access control client" refers generally to a logical entity, either embodied within hardware or software, suited for controlling access of a first device to a network. Common examples of access control clients include the aforementioned USIM, CDMA Subscriber Identification Modules (CSIM), IP Multimedia Services Identity Module (ISIM), Subscriber Identity Modules (SIM), Removable User Identity Modules (RUIM), etc.

Traditionally, the USIM (or more generally "SIM") performs the well-known Authentication and Key Agreement (AKA) procedure, which verifies and decrypts the applicable data and programs to ensure secure initialization. Specifically, the USIM must both (i) successfully answer a remote challenge to prove its identity to the network operator, and (ii) issue a challenge to verify the identity of the network.

However, existing SIM solutions have multiple weaknesses or disadvantages. Firstly, the SIM software is hardcoded to the physical UICC card media; the subscriber needs a new UICC to change SIM operation. This can be detrimental to both MNOs and subscribers; for example, if the authentication procedures are "broken" (e.g., via malicious "hacking" activities), the subscriber must be issued a new UICC, and this process is both time consuming and expensive. Moreover, for reasons described in greater detail subsequently herein, the physical SIM only recognizes a single trusted entity; specifically, the Mobile Network Operator (MNO) that it is configured to communicate with. Thus, there is no current method for incorporating post-deployment programming, except via the existing trusted relationship between the device and the MNO. For example, third-party SIM developers who wish to provide new or upgraded SIM software are stymied both by the inflexibility of physical SIM card media, as well as their inability to establish a trusted relationship between themselves and the subscriber's SIM. This control "bottleneck" greatly limits the number and capabilities afforded to SIM vendors.

Accordingly, new solutions are needed for enabling post-deployment SIM distribution, and modification. Ideally, such solutions should enable the mobile device to receive and implement changes to SIM operation while the device is in the "field" (post-deployment). Moreover, the improved methods and apparatus should support other desirable features such as, inter alia, support for multiple SIM profiles, flexible operation, updates, etc.

More generally however, improved methods and apparatus are needed for secure modification, storage, and execution of access control clients. Techniques for modifying access control client operation are needed to support features such as multiple subscriber access profiles, secure device updating, alternative methods for subscriber service provisioning, etc. Furthermore, due to the sensitive nature of access control and the possibility for surreptitious use and service theft, secure methods for performing such modifications are a chief concern.

SUMMARY

The present invention satisfies the aforementioned needs by providing improved apparatus and methods for secure modification, storage and execution of access control clients.

In a first aspect of the invention, a wireless apparatus is disclosed. In one embodiment, the apparatus includes: one or more wireless links adapted to communicate with at least one network via an access control client; a secure element configured to store the access control client; an interface to the secure element, the interface having a cryptographic key and endorsement certificate associated therewith; a processor; and a storage device in data communication with the processor, the storage device comprising computer-executable instructions. At least a subset of the computer-executable instructions are further partitioned into one or more segments.

In one variant, the computer-executable instructions, when executed by the processor: transmit a request for one or more components for an access control client specific to the at least one network via the interface, the request including the endorsement certificate and the cryptographic key; receive the one or more requested components, the one or more components associated with a second endorsement certificate; verify the second endorsement certificate; and responsive to successful verification of the second endorsement certificate, load the access control client.

In a second aspect of the invention, a method for mutual authentication is disclosed. In one embodiment, the method includes: requesting one or more components, the requesting being associated with a first endorsement certificate; receiving the one or more components and a second endorsement certificate; and loading the one or more components if the second endorsement certificate is valid, where the first and second endorsement certificates are issued by a trusted entity.

In a third aspect of the invention, a method of executing an access control client is disclosed. In one embodiment, the method includes: executing a first bootstrap operating system, the bootstrap operating system selecting a secure partition, the secure partition being associated with only one access control client; verifying the secure partition, the secure partition including one common operating system and one access control client; and executing the common operating system, the common operating system loading the one access control client. The access control client is configured to authenticate with a network, such as an external cellular network.

In a fourth aspect of the invention, a mobile device is disclosed. In one embodiment, the mobile device is configured to request, receive, and utilize a virtual or electronic SIM data structure using a bootstrap OS architecture.

In a fifth aspect of the invention, a computer readable apparatus is disclosed. In one embodiment, the apparatus includes a storage medium with at least one computer program running thereon, the at least one program being configured to receive, process, and provision requests for virtual or electronic SIMs using a bootstrap OS.

In a sixth aspect of the invention, a system for distributing virtual or electronic SIMs to users is disclosed. In one embodiment, the system includes apparatus for delivery of operating system components supporting eSIM delivery over a network, such as the Internet, or a MAN or WLAN.

Other features and advantages of the present invention will immediately be recognized by persons of ordinary skill in the art with reference to the attached drawings and detailed description of exemplary embodiments as given below.

DETAILED DESCRIPTION

Reference is now made to the drawings, wherein like numerals refer to like parts 30 throughout.

Overview

The present invention provides, inter alia, secure methods and apparatus by which user equipment and any trusted third-party entity can mutually verify one another. It also discloses method and apparatus that enable any third-party entity to become trusted, even after the user equipment has been deployed. For example, a mobile device (e.g., UMTS UE) can identify a third-party eSIM (e.g., virtual or electronic SIM—hereinafter "eSIM") vendor, and initiate a trusted dialog to purchase, acquire, or update its eSIM. Similarly, the third-party eSIM vendor can verify that the UE is a trusted device, and securely encode its eSIM for delivery. The trusted dialog is based on a unique device key and endorsement certificate; as described hereinafter, in one exemplary embodiment the device key is based on a public/private key cryptography.

Various aspects of the present invention are directed to secure reception of an access control client (in whole or part). Due to the sensitive nature of access control material for network operators, existing solutions have favored the use of physical card form factors. However, the present invention advantageously provides secure delivery of virtualized or electronic access control clients (e.g., eSIMs), thereby obviating requirements for physical cards and their associated limitations.

Moreover, unlike existing solutions, the present invention enables delivery of access control client material without a pre-existing access control client, thereby greatly enhancing user flexibility and use experience.

In yet another aspect of the invention, a device (e.g., mobile user device) can activate and execute one of multiple stored access control clients (e.g., eSIMs). In particular, when loading an eSIM the operating system (OS) need only load the list of software necessary for the current run-time environment. This "sandboxing" effect ensures that multiple eSIMs can be utilized within the same device without inappropriate access to other eSIMs.

Detailed Description of Exemplary Embodiments

Exemplary embodiments and aspects of the present invention are now described in detail. While these embodiments and aspects are primarily discussed in the context of Subscriber Identity Modules (SIMs) of a GSM, GPRS/EDGE, or UMTS cellular network, it will be recognized by those of ordinary skill that the present invention is not so limited. In fact, the various aspects of the invention are useful in any wireless network (whether cellular or otherwise) that can benefit from the secure modification, storage and execution of access control entities or clients.

It will also be recognized that while the term "subscriber identity module" is used herein (e.g., eSIM), this term in no way necessarily connotes or requires either (i) use by a subscriber per se (i.e., the invention may be practiced by a subscriber or non-subscriber); (ii) identity of a single individual (i.e., the invention may be practiced on behalf of a group of individuals such as a family, or intangible or fictitious entity such as an enterprise); or (iii) any tangible "module" equipment or hardware.

Prior Art Subscriber Identity Module (SIM) Operation

Within the context of prior art UMTS cellular networks, a user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services. The USIM software is based on the Java Card™ programming language. Java Card is a subset of the Java™ programming language that has been modified for embedded "card" type devices (such as the aforementioned UICC).

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICC-ID) and a specific authentication key (K). The network operator stores the association in a registry contained within the network's Authentication Center (AuC). After personalization the UICC can be distributed to subscribers.

Figure 1:
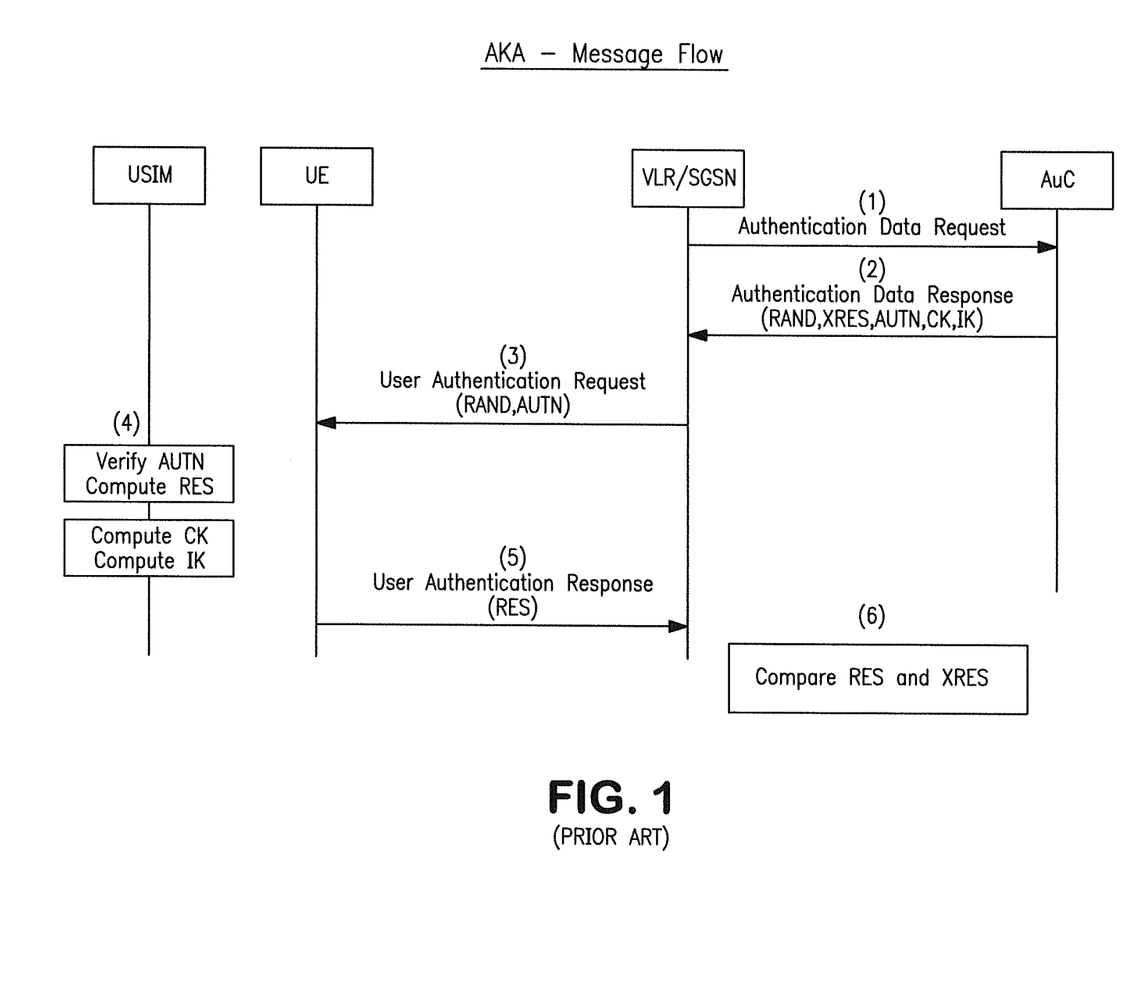
FIG. 1 graphically illustrates one exemplary Authentication and Key Agreement (AKA) procedure using a prior art USIM.

Referring now to FIG. 1, one exemplary Authentication and Key Agreement (AKA) procedure using the aforementioned prior art USIM is illustrated in detail. During normal authentication procedures, the UE acquires the International Mobile Subscriber Identify (IMSI) from the USIM. The UE passes the IMSI to the Serving Network (SN) of the network operator or the visited core network. The SN forwards the authentication request to the AuC of the Home Network (HN). The HN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE receives the RAND and AUTN, the USIM verifies if the received AUTN is valid. If so, the UE uses the received RAND to compute its own response (RES) using the stored K and the same algorithm that generated the XRES. The UE passes the RES back to the SN. The SN compares the XRES to the received RES and if they match, the SN authorizes the UE to use the operator's wireless network services.

Example Operation

Various aspects of the present invention are now discussed with respect to one exemplary implementation. In the context of the exemplary embodiment of the present invention, instead of using a physical UICC as in the prior art, the UICC is emulated as a virtual or electronic entity such as e.g., a software application, hereafter referred to as an Electronic Universal Integrated Circuit Card (eUICC), that is contained within a secure element (e.g., secure microprocessor or storage device) in the UE. The eUICC is capable of storing and managing multiple SIM elements, referred hereafter as Electronic Subscriber Identity Modules (eSIM). Each eSIM is a software emulation of a typical USIM, and contains analogous programming and user data associated therewith. The eUICC selects an eSIM based upon the eSIM's ICC-ID. Once the eUICC selects the desired eSIM(s), the UE can initiate an authentication procedure to obtain wireless network services from the eSIM's corresponding network operator. Moreover, each eSIM application generally encompasses access control clients such as the aforementioned USIM, CSIM, ISIM, SIM, RUIM, etc. It is understood that each eSIM is associated with a user account, thus an "eSIM" may broadly encompass multiple access control clients (e.g., a user may have a USIM, and a SIM associated with the same eSIM account).

As previously alluded to, the prior art USIM procedure described supra uses a pre-shared key to authenticate to the Core Network (e.g., the aforementioned Home Network (HN), Serving Network (SN), and Authentication Center (AuC), etc.) Accordingly, the USIM procedure is necessarily a "closed" system for the network operator, as the pre-shared key must be closely guarded. In contrast, the present invention provides secure methods for the eUICC and any third-party entity to mutually trust one another; and enables any third-party entity to become trusted, even after the user equipment is deployed.

Accordingly, the present invention has in some respects significantly more complex security requirements, but also advantageously offers much more flexibility. Furthermore, it will be recognized by those of ordinary skill that while various aspects of the present invention benefit from use with "virtual" software constructs (e.g., eUICC, eSIM), the benefits are not limited to these virtual embodiments. In fact, the principles discussed herein are equally applicable for secure modification, storage and execution of access control client embodied within, inter alia, physical card media, dedicated security hardware, etc.

Establishing Trusted Communication

Figure 2:
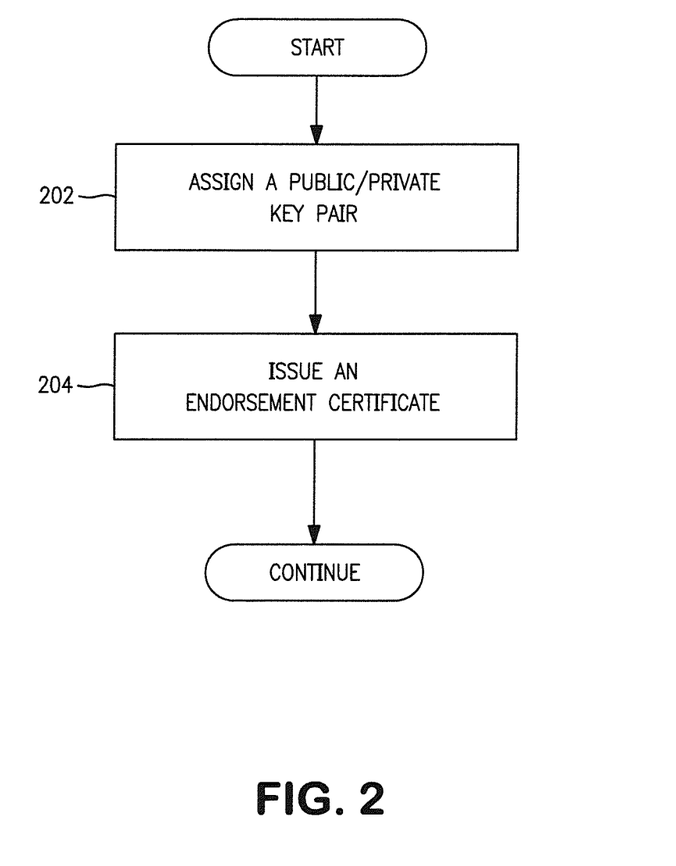
FIG. 2 is a logical flow diagram illustrating one embodiment of a method for assigning a device key pair to a software entity (e.g., a user equipment (UE), a third-party software vendor, SIM vendor, etc.) according to the invention.

FIG. 2 illustrates one exemplary method for assigning a device key pair to a software entity (e.g., an eUICC, a third-party software vendor, SIM vendor, etc.). At step 202, a cryptographic public/private key pair (e.g., Rivest, Shamir and Adleman (RSA) algorithm) is assigned to the software entity, and stored in a physically protected secure element of the software entity; e.g., the eUICC within the UE, a secure database within the third-party software vendor). For example, the eUICC is programmed by a trusted entity; or, alternately, may internally generate the public/private key pair when first manufactured/activated.

As a brief aside, a public/private key pair is based on a secret private key, and a publishable public key. Public/private key schemes are considered "asymmetric", as the key used to encrypt and decrypt are different, and thus the encrypter and decrypter do not share the same key. In contrast "symmetric" key schemes utilize the same key (or trivially transformed keys) for both encryption and decryption. The Rivest, Shamir and Adleman (RSA) algorithm is one type of public/private key pair cryptography that is commonly used within the related arts, but it will be recognized that the present invention is in no way limited to the RSA algorithm.

Public/private cryptography schemes can be used to encrypt a message, and/or generate signatures. Specifically, a message can be encrypted with a private key, and decrypted with the public key, thereby assuring that the message has not been altered in transit. Similarly, a signature generated with the private key can be verified with the public key, assuring that the entity generating the signature is legitimate. In both uses, the private key is kept hidden, and the public key is freely distributed.

At step 204, an endorsement certificate is issued for the public/private key pair. For instance, the trusted entity attests to the authenticity of the eUICC and the secrecy of the private key by issuing an "endorsement" certificate for the eUICC key pair. This public/private key pair is now the device key pair for the eUICC.

In one embodiment, the endorsement certificate comprises a collection of data which may include, but is not limited to: (i) identity information for the certifying authority, (ii) identifying information for the device, (iii) metadata describing certifying algorithms, and/or (iv) the appropriate public keys. These components may further be signed with the endorser's private key. In one embodiment, during normal operation, this digital signature is checked by the receiver to verify that the contents are secure and have not been tampered with.

Since the device key pairs are asymmetric, the public keys can be distributed without compromising the integrity of the private keys. Accordingly, the device key and certificate can be used to protect and verify the communication between previously unknown parties (e.g., the eUICC, and the third-party). Consider the following exemplary transaction for secured delivery of run-time components between an eUICC and a software vendor (shown at FIG. 3).

Figure 3:
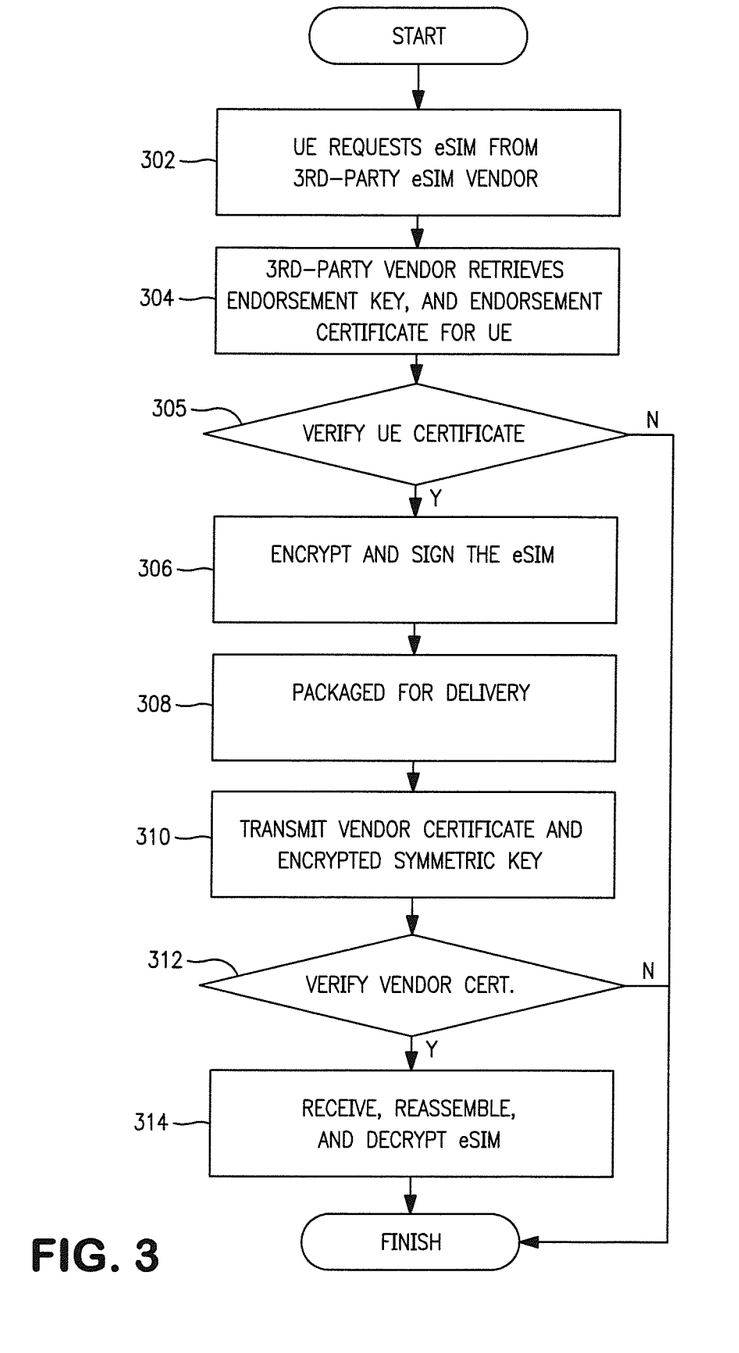
FIG. 3 graphically illustrates an exemplary transaction for secured delivery of runtime components between a UE and a software vendor according to one embodiment of the invention.

At step 302 of FIG. 3, a eUICC requests an eSIM from a third-party eSIM vendor. While the following example describes secure transfer of an eSIM application, other common examples of run-time environment applications might include patches, fully featured operating systems, etc.

At step 304, the third-party eSIM vendor retrieves the public device key corresponding to the eUICC from the endorsement certificate e.g., the endorsement certificate can be obtained from a database, querying the eUICC, etc. It is of particular note that the eUICC's counterpart private key is advantageously never exposed to the third-party eSIM vendor during this process.

At step 305, the third-party eSIM vendor verifies the endorsement certificate. In one exemplary embodiment, the endorsement certificate is uniquely signed by a trusted entity (such as the Assignee hereof, Apple™). Once the third-party eSIM vendor has verified the endorsement certificate, then third-party eSIM vendor can be assured that the eUICC is trusted by the trusted entity (e.g., Apple™), and by association, is secure.

At step 306, the eSIM run-time environment is encrypted and then signed by the third-party software vendor for the particular eUICC corresponding to the UE. In alternate embodiments, the eSIM run-time environment is signed first, and then encrypted. In one exemplary case, the vendor uses its own vendor asymmetric signing key and RSA public/private key and certificate chain to sign the eSIM, and uses an ephemeral or temporary symmetric key to encrypt the eSIM. The temporary symmetric key is generated randomly while preparing the package for the eUICC.

At step 308, the signed and encrypted eSIM run-time environment is split up into multiple packages for delivery (e.g., over a wireless interface, etc.), by the third-party eSIM vendor. For example, the signed and encrypted eSIM is split and sized into packets that are appropriate to the quality of the communication link (packaged delivery supports various desirable error correction schemes well known in the related arts).

At step 310, the ephemeral symmetric key is transmitted securely to the eUICC, such as by encrypting it with the appropriate eUICC public key. The vendor certificate may be transmitted as plaintext, or alternately may be encrypted. Generally, the vendor certificate is not encrypted to reduce processing burden on the receiver (however this is not a requirement of the system and encryption may be used either in all cases or alternatively, may be selectively applied).

At step 312, the eUICC verifies the vendor certificate. It should be noted that successful verification of the vendor's certificate with the vendor's public signature key provides the eUICC with proof that the signature is not falsified.

In some cases, the vendor certificate may include further signatures by an external trusted entity (e.g., a MNO, etc.). If the vendor certificate is valid, then the UE decrypts the ephemeral symmetric key, with its (the eUICC's) private key. Successful completion of the foregoing exchange ensures that the path between the eUICC and third-party entity is secure, and encrypted with a common ephemeral symmetric key for further data transaction.

Accordingly at step 314, the bulk encrypted packages can be securely received, reassembled, and decrypted by the eUICC. In this particular example, the eUICC downloads packages for the eSIM.

In one embodiment, the vendor certificate, key and encrypted packages are transmitted together. Alternate embodiments use other paradigms; e.g., transmit the certificate and key, establish a secure connection first, and then initiate transmission of the encrypted packages over the secure connection.

The exemplary embodiment of the present invention treats the eSIM as a separate entity from the eUICC. Accordingly, the eUICC can establish a secure connection to a third-party entity, without the benefit of an existing eSIM, and even after the user equipment is deployed. The exemplary eUICC enables secure delivery of an eSIM, thus directly enabling a third-party eSIM vendor to distribute eSIMs to a mobile device, without the previous reliance on the existing SIM AKA procedure.

More directly, the device has a distinct asymmetric device key pair which is separate from the symmetric key associated with any single eSIM (and the MNO issuing the eSIM). This distinction between eSIM and eUICC has significant repercussions for the complexity of the device operating system.

Execution of Secure Partitions

As previously alluded to, existing solutions for physical UICCs contain a single USIM entity; however, those skilled in the related arts will recognize that various aspects of the present invention are readily suited for storing and executing multiple access control client profiles. Accordingly, in another embodiment of the present invention, the eUICC must determine the validity of both the network and the eSIM. Due to the complexity of the foregoing tasks, the prior art SIM architecture is no longer sufficient for initialization. Instead, in one exemplary embodiment of the invention, the bootstrap operating system (OS) loads a "common" or "resident" operating system; the common OS loads an appropriate eSIM, and the loaded eSIM can execute the previously described Authentication and Key Agreement (AKA) procedure.

Specifically, the bootstrap OS of the present invention is in one implementation responsible for cryptographic verification, decryption, and loading of the common OS, and all patches associated with an activated eSIM. The bootstrap OS is executed on a virtualized software eUICC; consequently, the eSIM and associated common OS are "sandboxed"; they can only access appropriate patches made available through the eUICC. For example, in one exemplary embodiment, the eUICC only enables patches that share the same signatory as the eSIM.

Figure 4:
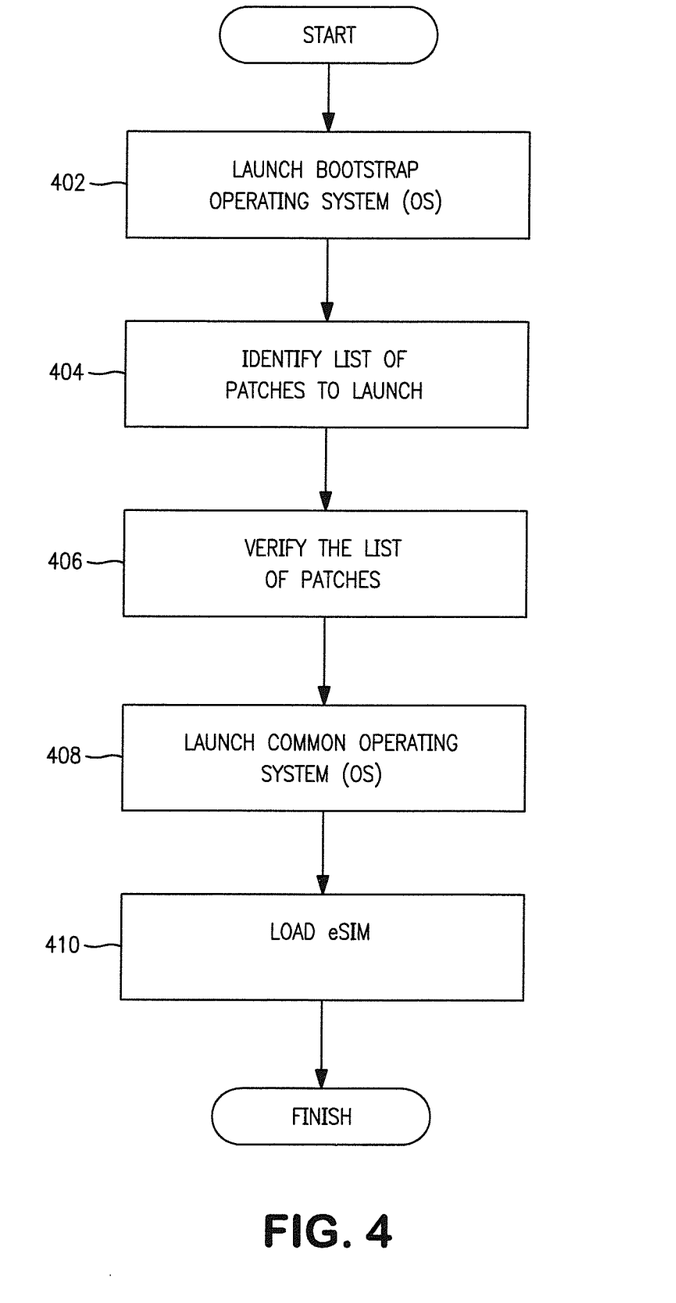
FIG. 4 graphically illustrates one embodiment of a method for secure execution of an eSIM, according to the invention.

Referring now to FIG. 4 one exemplary method for securely executing partitioning an eSIM is described.

At step 402, the eUICC launches the bootstrap OS at chip reset. At step 404, the bootstrap OS analyzes the entitled list of patches to launch for the run time environment.

For example, the bootstrap OS may identify a default network and its associated patches. At least one of these patches is the common OS, other patches include an active eSIM, and any additional patches associated with the eSIM.

At step 406, the bootstrap OS verifies the integrity of the patches e.g., by analyzing a certificate, or other means. For example, in one embodiment, a trusted entity (e.g., the Assignee of record), could issue certificates, or otherwise function as a root of trust for signature chains. If the patches are properly signed, then the bootstrap OS can execute the patches. Only verified patches corresponding to the appropriate eSIM are loaded (other patches may be stored, but are not executed within the "sandbox").

At step 408, the bootstrap OS launches the common OS. The common OS provides the interface between the eSIM and the remaining hardware. The common OS generally provides the input and output functions that emulate the UICC specific to a particular eSIM. Generally, this includes functions such as file input and output (IO), etc.

Thereafter, at step 410, the common OS can execute the appropriate eSIM.

Figure 4A:
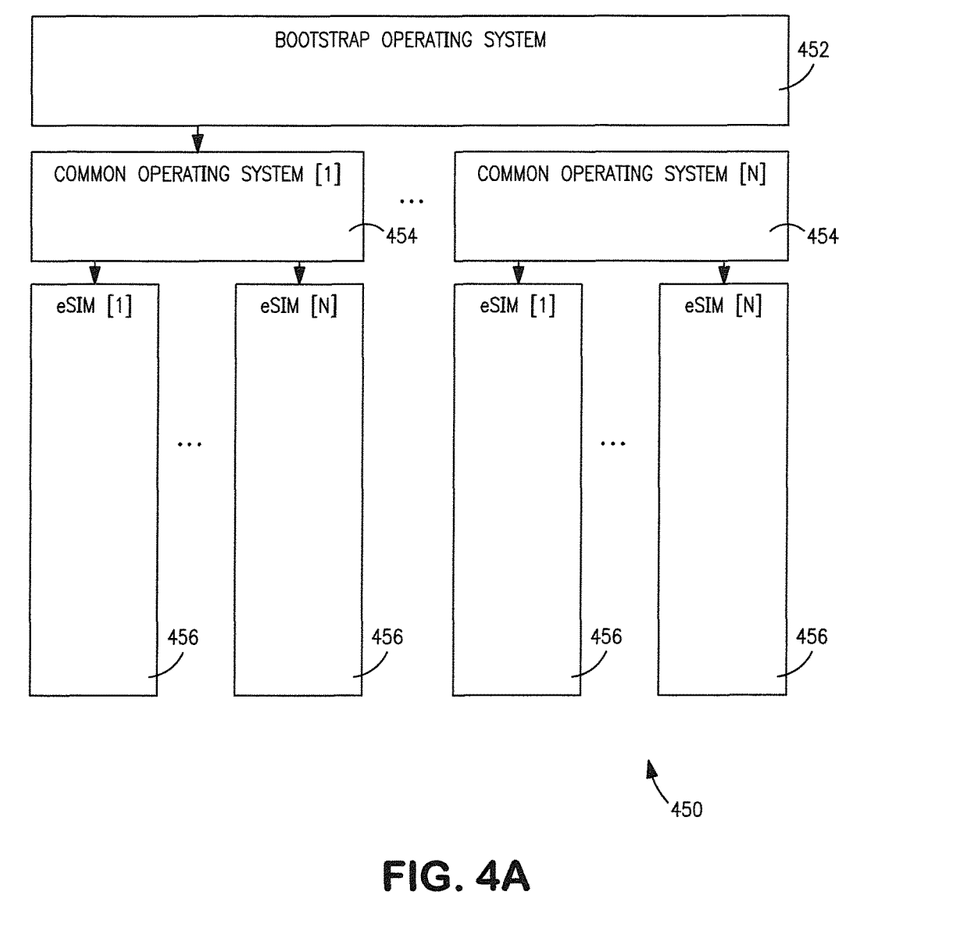
FIG. 4A graphically illustrates one embodiment of a bootstrap OS, eUICC, and eSIMs architecture according to the invention.

FIG. 4A illustrates the software relationship 450 between the bootstrap OS 452, the common OS 454, and the eSIMs 456. Most notably, the exemplary embodiment (as described in FIGS. 4 and 4A) different eSIM profiles operate within their own common OSs. By separating the run time environments for the different eSIM profiles into distinct sandboxes, the foregoing embodiment advantageously remains compatible with legacy SIM architectures, but leverages the benefits of the present invention. Generally, by ensuring that each eSIM is executed in its own environment, existing SIM software can be directly virtualized. Moreover, sandboxes ensure that the existence of other eSIMs will not cause adverse interaction, which is a requirement necessary to support a wide population of third-party eSIM vendors (e.g., which may have proprietary protocols, and capabilities, etc.)

As previously noted, the foregoing discussion is based primarily on SIM-based network technologies and features. Consequently, a description of exemplary embodiments of generalized methods and apparatus for implementing one or more aspects of the invention is now presented.

Methods

Figure 5:
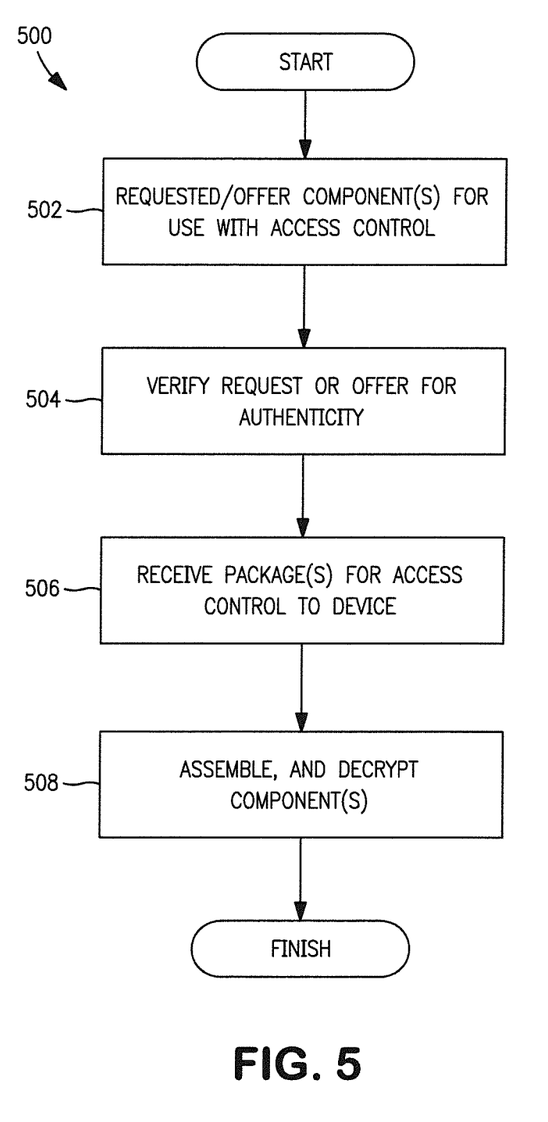
FIG. 5 is a logical flow diagram illustrating one embodiment of a generalized method for secure modification, and storage of components for use with access control clients.

Referring now to FIG. 5, one embodiment of a generalized method 500 for secure modification, and storage of components for use with access control clients is illustrated.

At step 502, one or more components for use with an access control client are requested or offered. In one exemplary embodiment, the one or more components include, in whole or part, (i) a common operating system, (ii) at least one eSIM, and/or (iii) one or more personalization patches associated with the eSIM. In other technology implementations, the packages may be associated with CDMA Subscriber Identification Modules (CSIM), IP Multimedia Services Identity Module (ISIM), Subscriber Identity Modules (SIM), Removable User Identity Modules (RUIM), etc. Near limitless permutations of various analogous structures will be recognized by those of ordinary skill within the arts given the present disclosure, the modification of the methods and apparatus presented herein to accommodate such analogous structures and permutations being well within the skill of an ordinary artisan given this disclosure.

In one embodiment, the one or more components are requested or "pulled" by a device, or subscriber associated with the device; i.e., by the device/user issuing an affirmative communication or request. In alternate embodiments, the one or more components are assigned or "pushed" to the device; i.e., without the aforementioned communication or request, but rather according to some other criteria or scheme such as e.g., periodically, based on the occurrence of an event, etc. The existence of one or more components can be advertised, or otherwise broadcast, or stored in a repository that can be accessed or searched.

In other embodiments, the one or more components are queried or otherwise triggered by one or more contextual events e.g., a device entering a specified area, exceeding a specified usage, etc.

The request or offer may also include a signature or certificate which originated from a trusted party. In other alternate implementations, the request or offer comprises a cryptographic challenge. In yet other variants, the request or offer includes a means for determining authenticity (e.g., user interface based password authentication, etc.).

The request or offer may also include a transactional key. In one such variant, the transactional key is an ephemeral key. Yet still other persistent transactional keys may also be implemented; for example, the key may be the same for multiple transaction sessions, multiple users, etc. In other variants, the transactional key is a symmetric key, or alternately an asymmetric key.

At step 504, the request or offer is verified for authenticity. In one embodiment, the signature or certificate which originated from a trusted party is checked for validity. In some cases, this may require external contact to the trusted party. Alternately, the validity of the signature or certificate may be self-evident or otherwise discoverable by the verifier without resort to the trusted party. Yet other schemes may rely on subscriber input; for example username and password entry, or simple acknowledgement schemes, etc.

Successful verification may also be configured to require one or more challenge response exchanges. In some variants, the verification may be unidirectional (e.g., only one of the transactors is being verified), or bidirectional (e.g., both transactors must succeed). In still other schemes, verification is performed out-of-band (e.g., via another communication path) or via subscriber assistance, etc.

Successful verification results in agreement on one or more parameters necessary for secured transaction. For example, in one embodiment, one or more transactional keys are established. In some variants, a transactional key is generated after verification. In alternate variants, the transactional key is proposed or generated prior to verification, and conditionally used thereafter.

Thereafter, at step 506, a device receives one or more packages associated with an access control client. The packages may be further encrypted with the transactional key to ensure secure transmission. In one variant, the packages are asymmetrically encrypted; i.e., the packages are encrypted with a public key. In other variants, the packages are symmetrically encrypted, using a previously agreed upon shared key. Alternatively, the packages are signed with an identifiable signature. Myriad other solutions for verifiable delivery of packages known within the related arts may be used consistent with the present invention.

At step 508, the device assembles the packages, and decrypts the one or more components. In one exemplary embodiment, the one or more components are associated with the appropriate common operating system. For example, as previously described, the patches may include at least one eSIM, and/or one or more personalization patches associated with the eSIM as previously described. At the conclusion of step 508, the one or more components have been successfully and securely transferred to the target device.

Figure 6:
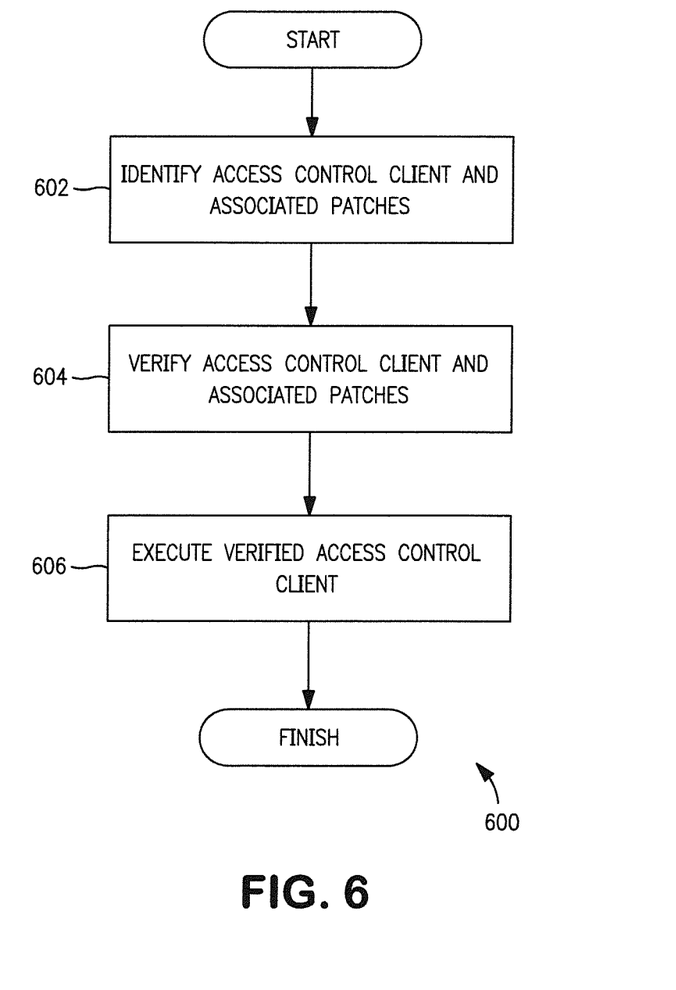
FIG. 6 is a logical flow diagram illustrating one embodiment of a generalized method for secure execution of components for use with access control clients according to the invention.

Referring now to FIG. 6, an exemplary embodiment of a generalized method 600 for secure execution of components for use with access control clients is illustrated.

At step 602, an access control client and one or more associated patches are identified. In one exemplary embodiment, the access control client and one or more associated patches are selected by an operating system. In one implementation, the operating system is further booted from a simple bootstrap operating system.

In one configuration, the bootstrap operating system maintains multiple secure partitions, where each partition is distinct from other partitions, and software executed from the memory partition cannot access or be accessed by other unrelated partitions. For example, one exemplary device executes a simple bootstrap OS; the simple bootstrap OS loads and executes a common OS, and its associated eSIM, and patches, within a single "sandbox" partition.

Various embodiments of the present invention separate the entire manifest of available components, and patches, according to one or more categorizations. In one such variant, components and patches are associated according to a common signatory or trusted origin. For example, in one scenario, the simple bootstrap OS may only permit the common OS, and eSIMs signed by the same eSIM vendor for execution. In other variants, components and patches may be associated according to user selection, or various levels of trust. For example, various components may be interspersed from different cooperative entities (e.g., a trusted eSIM vendor, and a trusted network personalization, etc.).

At step 604 of the method 600, the access control client and associated patches are verified for operation. In one embodiment, the access control client and associated patches are checked for integrity; i.e., that they have not been tampered with or otherwise altered. Common methods for such integrity checks include checksums, cryptographic hashes or residues, etc. Other solutions for verifying patch authenticity may include, verification of a certificate, verification of status, etc.

At step 606, the verified access control client is executed. Upon successful loading and execution, the access control client will execute initial access control procedures for an associated network. For example, a verified eSIM can execute the Authentication and Key Agreement procedure.

Exemplary Mobile Apparatus

Figure 7:
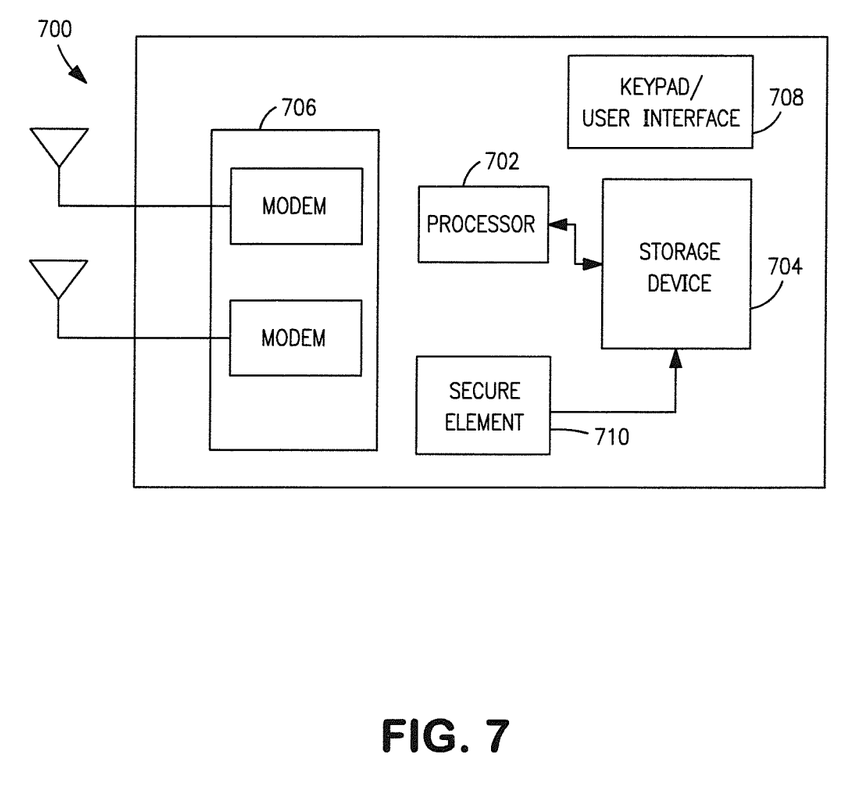
FIG. 7 is a block diagram of an exemplary apparatus useful for implementing the methods of the present invention.

Referring now to FIG. 7, exemplary apparatus 700 useful for implementing the methods of the present invention is illustrated.

The exemplary UE apparatus of FIG. 7 is a wireless device with a processor subsystem 702 such as a digital signal processor, microprocessor, field-programmable gate array, or plurality of processing components mounted on one or more substrates. The processing subsystem may also comprise an internal cache memory. The processing subsystem is connected to a memory subsystem 704 comprising memory which may for example, comprise SRAM, flash and SDRAM components. The memory subsystem may implement one or a more of CDMA type hardware, so as to facilitate data accesses as is well known in the art. The memory subsystem contains computer-executable instructions which are executable by the processor subsystem.

In one exemplary embodiment of the present invention, the device can comprise of one or more wireless interfaces (706) adapted to connect to one or more wireless networks. The multiple wireless interfaces may support different radio technologies such as GSM, CDMA, UMTS, LTE/LTE-A, WiMAX, WLAN, Bluetooth, etc. by implementing the appropriate antenna and modem subsystems.

The user interface subsystem 708 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

In the illustrated embodiment, the device comprises of a secure element 710 which contains and operates the eUICC application. The eUICC is capable of storing and accessing a plurality of access control client to be used for authentication with a network operator. The secure element is accessible by the memory subsystem at the request of the processor subsystem.

In one exemplary embodiment the secure element comprises at least a partition-able memory, wherein the partition-able memory is adapted to contain one or more access control clients and associated patches. Each partition is kept distinct from other partitions, and software executed from the memory partition cannot access or be accessed by other unrelated partitions.

The secure element may also comprise a so-called "secure microprocessor" or SM of the type well known in the security arts.

Furthermore, various realizations of the exemplary embodiment include instructions which when executed, launch a simple bootstrap operating system (OS). The bootstrap operating system is further configured to select at least one partition from the secure element, and load the appropriate access control client loaded therewith. In various implementations, the access control clients may further be provided with one or more certificates associated with a trusted signatory. The bootstrap OS may verify the certificates prior to execution of the access control client.

Moreover, in one embodiment, the secure element maintains a listing or manifest of stored access control clients. The manifest may include information as to the current status of the stored access control clients; such information may include availability, completeness, validity, prior experienced errors, etc. The manifest may be further linked or coupled to the user interface, so as to enable user selection of an available access control client.

Referring back to FIG. 7, the secure element 710 is capable of receiving and storing components for use with one or more access control client for authentication with a network operator. In one exemplary embodiment, the secure element has an associated device key and endorsement certificate. This device key is used to protect and verify the communication between previously unknown parties (e.g., the UE, and the third-party).

In one such variant, the device key is a private key of an asymmetric public/private key pair. The counterpart public key can be freely distributed without compromising the integrity of the private keys. For example, the device may be assigned (or internally generate) an RSA public/private key; the public key is made available for post deployment communication.

Furthermore, in some variants, the endorsement certificate is a uniquely signed digital signature associated with a trusted entity. In one exemplary scenario, the endorsement certificate is verifiable by third-party entities, and provides proof of the exemplary apparatus's integrity.

While the foregoing methods and apparatus for programming the secure element are illustrated with respect to a RSA key pair, it is readily appreciated by those of ordinary skill, that other authentication schemes may be similarly substituted. For example, in other variants, the device key may be a shared key, wherein the distribution of the shared key is highly guarded. Yet other embodiments may be based on certificates rather than cryptographic exchanges.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An electronic Universal Integrated Circuit Card (eUICC), comprising:
at least one processor; and
at least one memory storing instructions that, when executed by the at least one processor, cause the eUICC to:
identify an initialization of the eUICC, wherein the eUICC manages a plurality of secure partitions, and each secure partition of the plurality of secure partitions includes a respective access control client;
parse the plurality of secure partitions to identify an access control client for activation; and
cause an operating system (OS) associated with the access control client to execute within a limited scope that corresponds to the secure partition in which the access control client is included, wherein the OS, when executed, activates the access control client.

2. The eUICC of claim 1, wherein the access control client comprises an electronic Subscriber Identity Module (eSIM), and the eSIM is a virtualization of a physical SIM.

3. The eUICC of claim 1, wherein the at least one processor further causes the eUICC to:
authenticate the access control client by validating a first certificate associated with the access control client against a second certificate associated with the eUICC.

4. The eUICC of claim 1, wherein the initialization of the eUICC is issued in conjunction with a reset of the eUICC.

5. The eUICC of claim 1, wherein the access control client corresponds to a default Mobile Network Operator (MNO) associated with a mobile device in which the eUICC is included.

6. The eUICC of claim 1, wherein the secure partition in which the access control client is included stores at least one additional access control client.

7. The eUICC of claim 1, wherein activating the access control client enables a mobile device in which the eUICC is included to register with a Mobile Network Operator (MNO) that corresponds to the access control client.

8. An electronic Universal Integrated Circuit Card (eUICC), comprising:
at least one memory that includes a plurality of secure partitions, wherein each secure partition of the plurality of secure partitions includes a respective access control client; and
at least one processor configured to cause the eUICC to carry out steps that include, in response to identifying an initialization of the eUICC:
parsing the plurality of secure partitions to identify an access control client for activation;
authenticating the access control client; and
subsequent to authenticating the access control client:
causing an operating system (OS) associated with the access control client to execute within a limited scope that corresponds to the secure partition in which the access control client is included, wherein the OS, when executed, activates the access control client.

9. The eUICC of claim 8, wherein the access control client comprises an electronic Subscriber Identity Module (eSIM), and the eSIM is a virtualization of a physical SIM.

10. The eUICC of claim 8, wherein authenticating the access control client comprises:
validating a first certificate associated with the access control client against a second certificate associated with the eUICC.

11. The eUICC of claim 8, wherein the initialization of the eUICC is issued in conjunction with a reset of the eUICC.

12. The eUICC of claim 8, wherein the access control client corresponds to a default Mobile Network Operator (MNO) associated with a mobile device in which the eUICC is included.

13. The eUICC of claim 8, wherein the secure partition in which the access control client is included stores at least one additional access control client.

14. The eUICC of claim 8, wherein activating the access control client enables a mobile device in which the eUICC is included to register with a Mobile Network Operator (MNO) that corresponds to the access control client.

15. An electronic Universal Integrated Circuit Card (eUICC), comprising:
at least one memory storing a plurality of access control clients, wherein each access control client of the plurality of access control clients is included in a respective secure partition; and
at least one processor configured to cause the eUICC to carry out steps that include:
receiving a request to activate an access control client of the plurality of access control clients;
identifying a secure partition that includes the access control client, wherein the access control client is associated with an operating system (OS) that is configured to manage the access control client;
authenticating at least one of the access control client and the OS; and
subsequent to authenticating:
causing the OS to execute within a limited scope that corresponds to the secure partition, wherein the OS, when executed, causes the access control client to be activated.

16. The eUICC of claim 15, wherein the access control client comprises an electronic Subscriber Identity Module (eSIM), and the eSIM is a virtualization of a physical SIM.

17. The eUICC of claim 15, wherein authenticating the access control client comprises:
   validating a first certificate associated with the access control client against a second certificate associated with the eUICC.

18. The eUICC of claim 15, wherein the request to activate the access control client is issued in conjunction with a reset of the eUICC.

19. The eUICC of claim 15, wherein the access control client corresponds to a default Mobile Network Operator (MNO) associated with a mobile device in which the eUICC is included.

20. The eUICC of claim 15, wherein activating the access control client enables a mobile device in which the eUICC is included to, using at least one wireless interface included in the mobile device, register with a Mobile Network Operator (MNO) that corresponds to the access control client.

* * * * *